Dec. 2, 1958 W. E. BROWN ET AL 2,863,013
DIRECTION SIGNAL
Filed Sept. 14, 1955
2 Sheets-Sheet 1
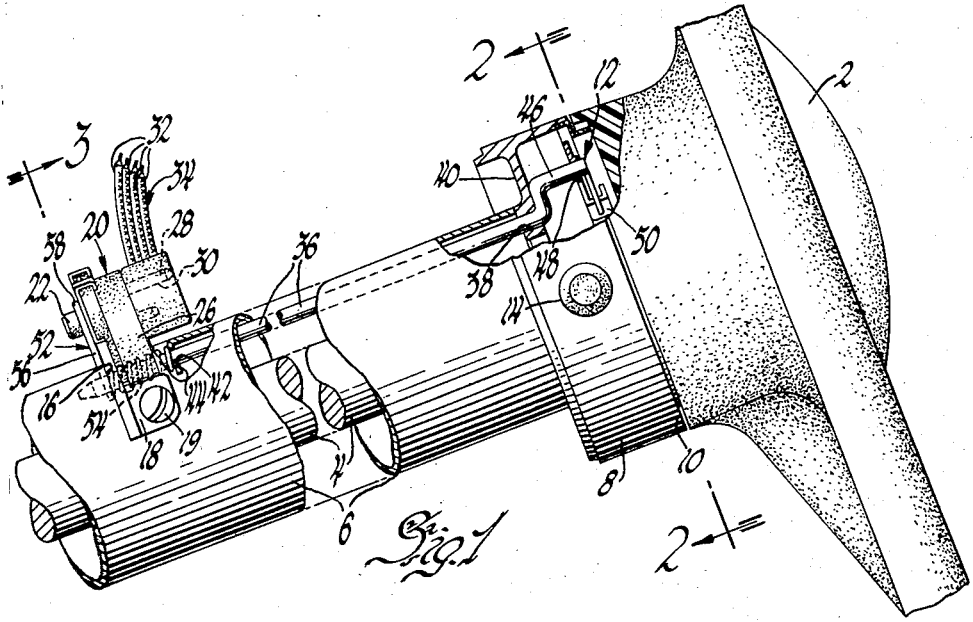
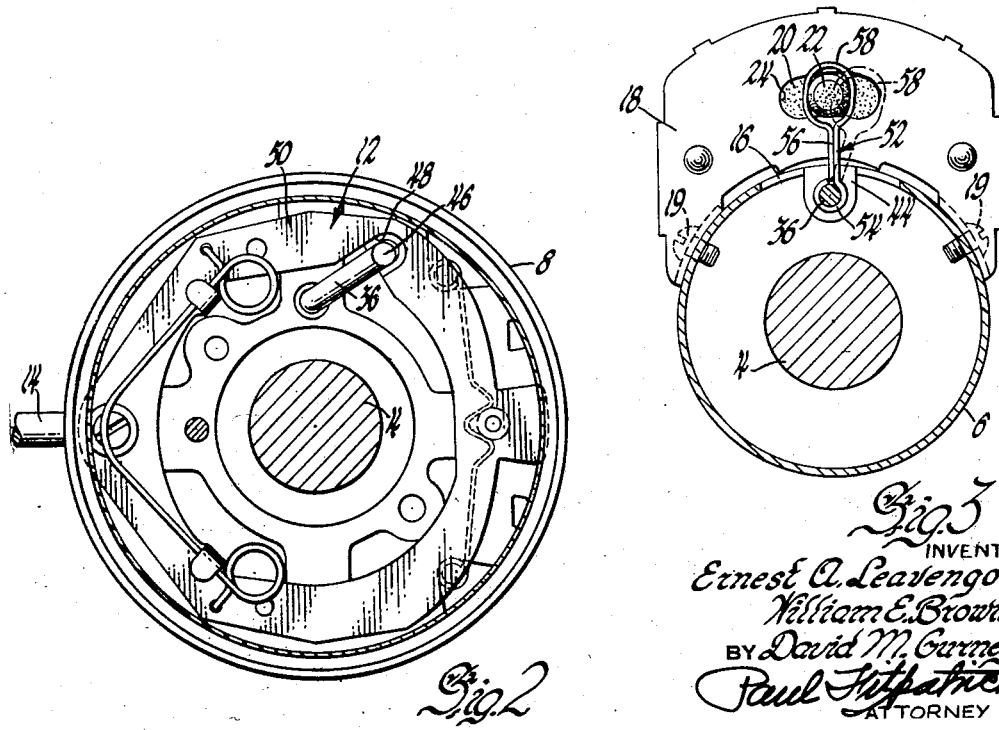
INVENTORS
Ernest A. Leavengood,
William E. Brown, &
BY David M. Gurney
Paul Fitzpatrick
ATTORNEY Dec. 2, 1958   W. E. BROWN ET AL   2,863,013
DIRECTION SIGNAL
Filed Sept. 14, 1955   2 Sheets-Sheet 2
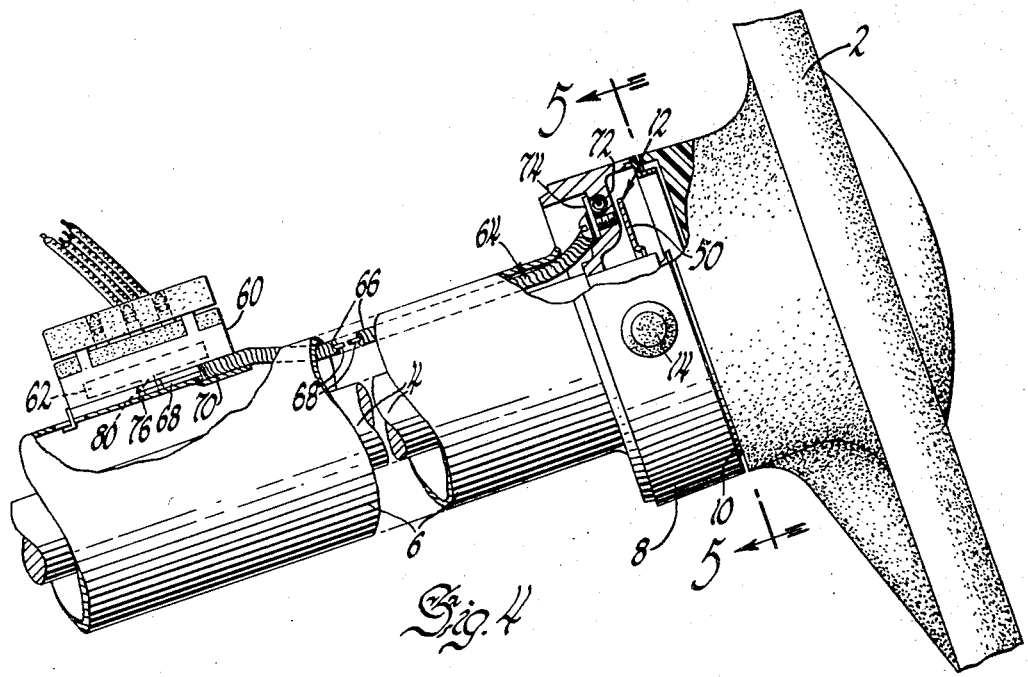
Fig. 4
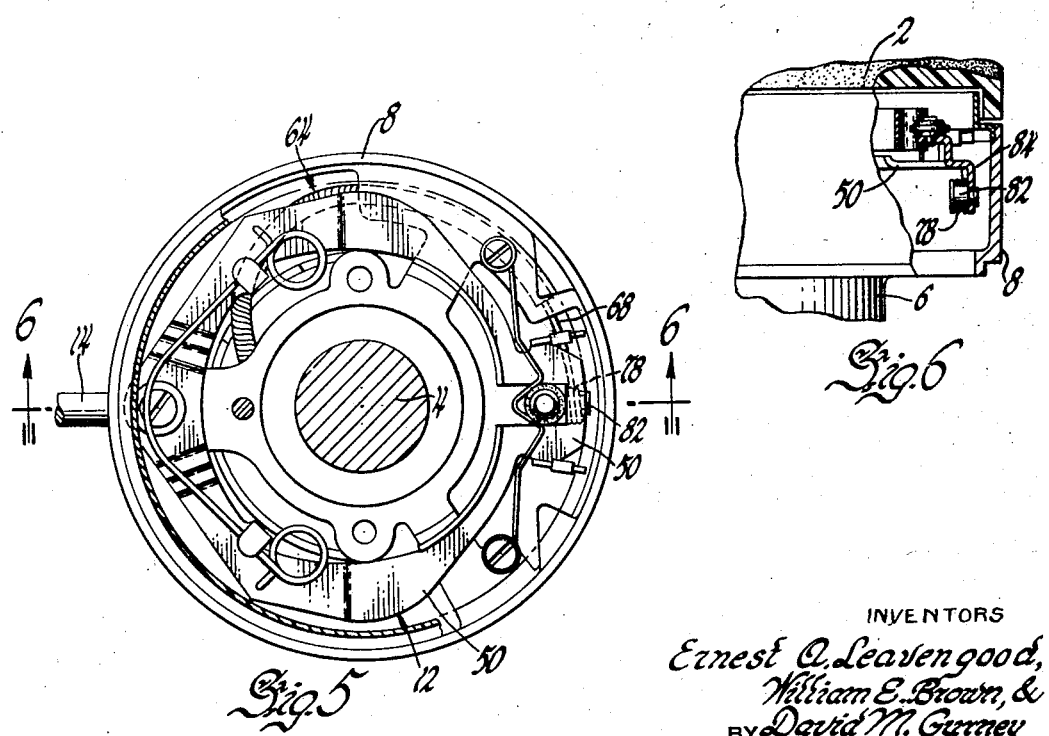
Fig. 5
Fig. 6
INVENTORS
Ernest O. Leavengood,
William E. Brown, &
BY David M. Gurney
Paul Kilpatrick
ATTORNEY

United States Patent Office 2,863,013
Patented Dec. 2, 1958

2,863,013

DIRECTION SIGNAL

William E. Brown, Anderson, Ind., and David M. Gurney, Fosters, and Ernest A. Leavengood, Lansing, Mich., assignors to General Motors Corporation, Detroit, Mich., a corporation of Delaware Application September 14, 1955, Serial No. 534,353

13 Claims. (Cl. 200—61.34)

This invention relates to direction signal switch mechanisms and more particularly to mechanisms of the type intended for installation as original equipment in automotive vehicles.

At the present time, the majority of passenger and commercial vehicles are equipped with factory installed direction signal switch mechanisms. Because virtually all such mechanisms are installed during the automotive assembly process, the typical direction signal switch mechanism is now designed and engineered as an integral part of the steering column assembly; that is, the steering column or mast jacket is provided with a cylindrical housing adjacent the base of the vehicle steering wheel to accommodate the necessary signal operating mechanism, which is usually annular in form and arranged in concentric relation with the column. By arranging the signal operating mechanism in the manner described, complete streamlining of the steering column assembly is achieved which does not detract from the general styling of the instrument and control sections of the vehicle. In addition, numerous mechanical and operational advantages have resulted, such as maximum protection for the operating mechanism and location of the manual control lever in the most convenient and natural position for the operator.

However, a serious disadvantage attending the adoption of "built-in" direction signal switch mechanisms has been the difficulties involved in repairing, replacing or adjusting damaged or malfunctioning mechanisms. Thus, even though only minor repairs or adjustment are required, it has been necessary, in the past, to remove the vehicle steering wheel in order to gain access to the operating mechanism and associated switch. In this connection, experience has shown that by far the greater proportion of malfunctions and failures of direction signal switch mechanisms are attributable to the electrical switches and wiring harness directly associated therewith, rather than to the mechanical operating elements of the mechanism. In addition to the difficulties attendant upon malfunction of the mechanism, prior art types of built-in direction signal switch mechanisms have generally required relatively long and bulky wiring harness which in the usual installation extended from the direction signal switch housing downwardly through the entire length of the steering column or mast jacket. Since the typical direction signal switch harness contained six or seven individual lead wires, installation of the harness within the steering column was not only difficult, but also unnecessarily expensive. Further, in the event of a short or open circuit in the harness at a point interiorly of the column, great difficulty was encountered in both tracing the malfunction and making the necessary replacement.

An object of the present invention is to provide a direction signal switch mechanism wherein a switch control mechanism is disposed axially adjacent the steering wheel while the direction signal circuit controlling switch member is disposed adjacent the opposite end of the steering column, the mechanism and switch being interconnected by axially extending members capable of causing concurrent operation.

Another object is to provide a manually set automatically reset direction signal control mechanism wherein an electrical switch operatively associated therewith is disposed in a readily accessible location remote from the mechanism.

A further object is to provide a device of the type described wherein the circuit controlling switch is adapted for plug-in engagement with the signal lamp wiring harness.

Still a further object is to provide a device of the stated character which requires a substantially reduced length of wiring harness.

These and other objects, advantages and features of the invention will become more fully apparent as reference is had to the accompanying specification and drawings wherein:

Fig. 1 is a fragmentary side elevational view of a vehicle steering column assembly, illustrating the form and arrangement of the invention with respect thereto, certain parts being broken away to more clearly illustrate the construction.

Fig. 2 is a view looking in the direction of arrows 2—2 of Fig. 1 illustrating the construction and arrangement of the mechanical elements of one form of switch controlling mechanism.

Fig. 3 is a view looking in the direction of arrows 3—3 of Fig. 1.

Fig. 4 is a view similar to Fig. 1 illustrating a modified form of the invention.

Fig. 5 is a view looking in the direction of arrows 5—5 of Fig. 4, and

Fig. 6 is a fragmentary view, partly in section, looking in the direction of arrows 6—6 of Fig. 5.

Referring now to the drawings and particularly to Fig. 1, there is illustrated a portion of a vehicle steering column assembly in which the reference numeral 2 designates generally a steering wheel. Steering wheel 2 is secured to the upper end of a steering shaft 4 in the conventional manner. Disposed in concentric surrounding relation about shaft 4 is a steering column or mast jacket 6 which extends between the steering wheel 2 and the vehicle steering gear mechanism, not shown. At its upper end, jacket 6 is provided with a relatively shallow large diameter housing 8 which is spaced slightly axially from the base 10 of steering wheel 2. Disposed interiorly of housing 8 is a direction signal switch operating mechanism 12 of the type adapted for manual setting by a lever 14 to either of two signal operating positions and effective upon rotation of the steering wheel in a correlated direction to automatically return the mechanism to neutral from either operating position. Since the precise construction of the operating mechanism 12 is substantially identical to that shown in the copending application Serial No. 444,068, William E. Brown et al., entitled Direction Signal, filed July 16, 1954, and assigned to General Motors Corporation, a detailed description thereof will be omitted. It will be understood, however, that the invention is not limited to any particular type of mechanism, the form shown being for illustrative purposes only. Near its lower end, column 6 is formed with a generally rectangular opening 16. Adjacent opening 16 there is mounted externally on the periphery of column 6 a bracket 18 which is secured to column 6 by means of machine screws 19. Bracket 18 provides a transverse platform or base to which is attached a multi-position electrical switch 20. Switch 20 is provided with a downwardly projecting operating pin 22 which extends through an arcuate slot 24 in the base of mounting bracket 18.

According to one feature of the invention, the base 26 of switch 20 has embedded therein a plurality of terminal prongs 28 which are adapted for frictional engagement with corresponding terminal sleeves 30 in a female plug assembly. Each of the terminal sleeves 30, in turn, are connected to individual lead wires 32 of wiring harness 34, as by soldering.

In order to accomplish synchronous correlated operation of switch 20 and operating mechanism 12 in accordance with the present invention, there is provided an elongated rod 36 which extends interiorly of column 6 between mechanism 12 and the switch 20. Rod 36 is rotatably supported at one end in an aperture 38 formed in the base 40 of housing 8 and at the other end in an aperture 42 formed in an inwardly bent finger portion 44 of column 6. At its upper end, rod 36 is provided with an offset or crank portion 46. As seen in Fig. 2, crank portion 46 operatively engages a notch 48 formed in the operating plate 50 of mechanism 12. Therefore, when operating plate 50 is swung to either the left or right operating position from the central neutral position shown in Fig. 2, the crank portion 46 imparts proportional rotation to rod 36 in a corresponding direction. At its lower extremity, rod 36 engages a crank arm 52. Crank arm 52 preferably formed of wire has an axially extending helical portion 54 and a transversely extending arm portion 56. Helical portion 54 frictionally engages the terminal end portion of rod 36 so that rotation thereof causes arm portion 56 to travel through a corresponding arc. At its outer end, arm portion 56 is formed with a loop 58 which surrounds operating pin 22. Consequently, when operating ring 50 is swung to an operating position, pin 22 of switch 20 is arcuately displaced to a circuit closing position corresponding to the adjusted position of operating mechanism 12.

In Fig. 4, there is illustrated a modification of the invention. In the modification shown, an electrical switch 60 is mounted on the steering column 6 so that movement of the circuit bridging member 62 is linear and parallel to the axis of the steering column. Extending between the switch 60 and the switch operating mechanism 12 is a Bowden cable assembly 64 which extends throughout the major portion of its length interiorly of column 6. Bowden cable 64 comprises sheath portion 66 and a slide wire 68. Sheath portion 66 is fixedly secured at its lower end to a depressed portion 70 formed in the steering column 6 adjacent the switch 60. The upper end of sheath portion 66, in turn, is clamped to the base 72 of housing 8 by means of a threadably secured plate 74. At its opposite ends, slide wire 68 is formed with looped portions 76 and 78. Looped portion 76 surrounds the radially inwardly projecting operating pin 80 of switch 60, while looped portion 78 is secured by means of a rivet 82 to a depending finger 84 formed on switch operating ring 50. As seen in Fig. 5, the upper end of Bowden cable 64 is coiled in a curved path approximating the arcuate path of movement of operating ring 50 and parallel to the plane thereof. Consequently, swinging movement of operating ring 50 causes axial movement of slide wire 68 in sheath 66. Since the lower end of slide wire 68 is directed in a linear path, arcuate movement of operating ring 50 in either direction from the neutral position causes the looped end portion 76 of slide wire 68 to reciprocate to a limited linear range of movement which is calibrated to cause corresponding linear movement of bridging member 62 to circuit control positions corresponding to the adjusted positions of ring 50.

While but two embodiments of the invention have been shown and described, it will be evident that numerous changes may be made therein. It is, therefore, to be understood that it is not intended to limit the invention to the embodiments shown but only by the scope of the claims which follow.

We claim:
1. In combination, a vehicle steering column, a direction signal switch operating mechanism disposed concentrically in said column adjacent the upper end thereof, a circuit controlling electrical switch disposed remotely from said mechanism, and a motion translating member disposed eccentrically to the axis of said column and extending between said mechanism and said switch for actuating the latter responsive to movement of the former.

2. In combination, a vehicle steering column, a manually set automatically reset direction signal switch operating mechanism disposed concentrically in said column adjacent the upper end thereof, a circuit controlling electrical switch disposed on said column remotely from said mechanism, and a motion translating member disposed eccentrically to the axis of said column and extending between said mechanism and said switch for actuating the latter responsive to movement of the former.

3. In combination, a vehicle steering column, a manually set automatically reset direction signal switch operating mechanism disposed concentrically in said column adjacent the upper end thereof, a circuit controlling electrical switch disposed exteriorly on said column remotely from said mechanism, and a motion translating member disposed eccentrically to the axis of said column and extending between said mechanism and said switch for actuating the latter responsive to movement of the former.

4. In combination, a vehicle steering column, a manually set automatically reset direction signal switch operating mechanism disposed concentrically in said column adjacent the upper end thereof, a circuit controlling electrical switch disposed externally on said column remotely from said mechanism, and an axially extending rotary member disposed eccentrically to the axis of said column and connecting said mechanism and said switch for actuating the latter responsive to movement of the former.

5. In a device of the class described, the combination of a steering column including a housing at one end thereof, a steering wheel axially adjacent said housing, a manually operable direction signal switch operating mechanism including an arcuately movable operating plate disposed in said housing adapted for automatic resetting responsive to movement of said steering wheel, a circuit controlling electrical switch mounted exteriorly on said column near the opposite end thereof, and an axially extending rod mounted for rotary movement in said column, the opposite ends of said rod operatively engaging said switch and said operating plate respectively whereby movements of said operating plate are imparted to said switch.

6. In a device of the class described, the combination of a steering column including a housing at one end thereof, a steering wheel axially adjacent said housing, a manually operable direction signal switch operating mechanism disposed on said housing adapted for automatic resetting responsive to movement of said steering wheel, a circuit controlling electrical switch mounted exteriorly on said column near the opposite end thereof, an axially movable means connecting said switch and said mechanism for causing correlated movement thereof.

7. The structure defined in claim 5 wherein said switch is mounted for arcuate movement in a path generally concentric with said column.

8. The structure defined in claim 6 wherein said switch is mounted for linear movement in a path parallel with the axis of said column.

9. The structure defined in claim 4 wherein said circuit controlling electrical switch is provided with external prong terminals adapted for cooperation with a plug-type connector.

10. The structure defined in claim 9 wherein said plug-type connector is operatively associated with a wiring harness arranged to provide energization and de-energization of direction signaling lamps.

11. In a device of the class described, the combination of a steering column including a housing at one end thereof, a steering wheel axially adjacent said housing, a manually operable direction signal switch operating mechanism including an arcuately movable operating plate disposed in said housing adapted for automatic resetting responsive to movement of said steering wheel, a circuit controlling electrical switch mounted exteriorly on said column near the opposite end thereof, and an axially extending member mounted in said column, the opposite ends of said member operatively engaging said switch and said operating plate respectively whereby movements of said operating plate are imparted to said switch.

12. In a device of the class described, the combination of a steering column including a housing at one end thereof, a steering wheel axially adjacent said housing, a manually operable direction signal switch operating mechanism including an arcuately movable operating plate disposed in said housing adapted for automatic resetting responsive to movement of said steering wheel, a circuit controlling electrical switch mounted exteriorly on said column near the opposite end thereof, and an axially extending rod mounted for rotary movement in said column, one end of said rod having a crank portion engaging said operating plate and means connecting the opposite end of said rod to said switch whereby movements of said operating plate in response to the manual or automatic operation of said operating plate are imparted to said switch.

13. The structure defined in claim 12 wherein the means connecting the opposite end of said rod to said switch includes a crank arm in frictional engagement with said rod.

References Cited in the file of this patent

UNITED STATES PATENTS

| | | |
|---|---|---|
| 1,815,871 | Douglas | July 21, 1931 |
| 1,853,513 | Douglas | Apr. 12, 1932 |
| 2,279,400 | Holm | Apr. 14, 1942 |
| 2,690,483 | Elliott et al. | Sept. 28, 1954 |
| 2,702,327 | Redick | Feb. 15, 1955 |
| 2,744,419 | Chayne | May 8, 1956 |

FOREIGN PATENTS

| | | |
|---|---|---|
| 408,106 | Germany | Jan. 9, 1925 |